United States Patent
Kataoka et al.

(10) Patent No.: US 9,939,535 B2
(45) Date of Patent: Apr. 10, 2018

(54) COMPTON CAMERA

(71) Applicants: WASEDA UNIVERSITY, Shinjuku-ku, Tokyo (JP); HAMAMATSU PHOTONICS K.K., Hamamatsu-shi, Shizuoka (JP)

(72) Inventors: Jun Kataoka, Tokyo (JP); Toru Nishiyama, Tokyo (JP); Shinji Ohsuka, Shizuoka (JP); Michito Hirayanagi, Shizuoka (JP); Shunsuke Adachi, Shizuoka (JP); Tetsuya Uchiyama, Shizuoka (JP)

(73) Assignees: WASEDA UNIVERSITY, Shinjuku-ku, Tokyo (JP); HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/027,765

(22) PCT Filed: Sep. 26, 2014

(86) PCT No.: PCT/JP2014/075715
§ 371 (c)(1),
(2) Date: Apr. 7, 2016

(87) PCT Pub. No.: WO2015/053098
PCT Pub. Date: Apr. 16, 2015

(65) Prior Publication Data
US 2016/0238719 A1    Aug. 18, 2016

(30) Foreign Application Priority Data
Oct. 10, 2013 (JP) ................... 2013-212844

(51) Int. Cl.
*G01T 1/24* (2006.01)
*G01T 1/20* (2006.01)

(52) U.S. Cl.
CPC ............ *G01T 1/244* (2013.01); *G01T 1/2018* (2013.01)

(58) Field of Classification Search
CPC .................................................. G01T 1/244
See application file for complete search history.

(56) References Cited

U.S. PATENT DOCUMENTS 5,821,541 A * 10/1998 Turner ................. G01T 1/006
250/363.03
2002/0175291 A1   11/2002 Reeder et al.
2014/0301535 A1 * 10/2014 Williams ......... G01N 23/20066
378/87

FOREIGN PATENT DOCUMENTS

| CN | 101571596 | 11/2009 |
|---|---|---|
| JP | H09-101371 A | 4/1997 |

(Continued)

OTHER PUBLICATIONS

Hamamatsu Photonics K.K., Waseda University, "Productization of Compton Camera for Gamma Ray Imaging to Streamline Decontamination of Radioactive Materials," Japan Science and Technology Agency (JST), Sep. 10, 2013, pp. 1-8, including partial English translation.

(Continued)

*Primary Examiner* — Edwin Gunberg
(74) *Attorney, Agent, or Firm* — Drinker Biddle & Reath LLP

(57) ABSTRACT

A Compton camera includes a scattering detection unit, an absorption detection unit, a signal processing unit, a first shield unit, and a second shield unit. The scattering detection unit detects Compton scattering of incident radiation emitted from a radiation source. The absorption detection unit detects absorption of incident radiation that has undergone Compton scattering at the scattering detection unit. The signal processing unit obtains an image of the radiation source based on coincident detection events of Compton scattering of radiation at the scattering detection unit and absorption of radiation at the absorption detection unit. The (Continued)

first and second shield units are provided between the scattering detection unit and the absorption detection unit. The first shield unit selectively allows forward-scattered radiation to pass and selectively blocks back-scattered radiation.

2 Claims, 12 Drawing Sheets

(56) References Cited

FOREIGN PATENT DOCUMENTS

| JP | 2005-208057 A | 8/2005 |
|---|---|---|
| JP | 4352122 B2 | 10/2009 |
| JP | 2011-085418 A | 4/2011 |

OTHER PUBLICATIONS

International Preliminary Report on Patentability dated Apr. 21, 2016 for PCT/JP2014/075715.
Saull, P. R. B., et al, "A Two-pixel Compton Imager", SPIE, P.O. Box 10, Bellingham, WA 98227-0010 USA, Dec. 31, 2010, XP040522058.
Saull, P. R. B., et al, "First demonstration of a Compton gamma imager based on silicon photomultipliers", Nuclear Instruments and Methods in Physics Research, Section A: Accelerators, Spectrometers, Detectors, and Associated Equipment Elsevier Bv North-Holland, NL, vol. 679, Mar. 6, 2012, p. 89-p. 96, XP028480223.

* cited by examiner

Fig.1
(a)
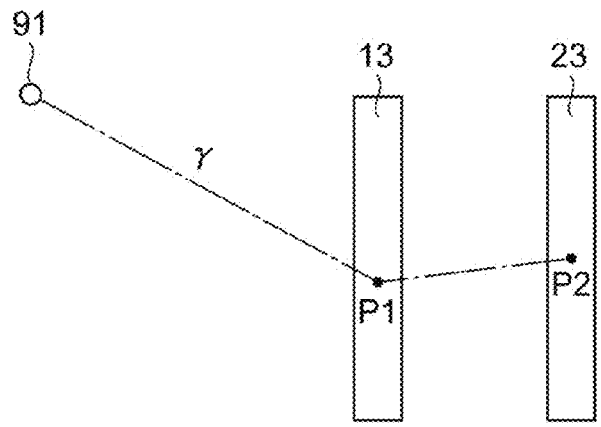
(b)
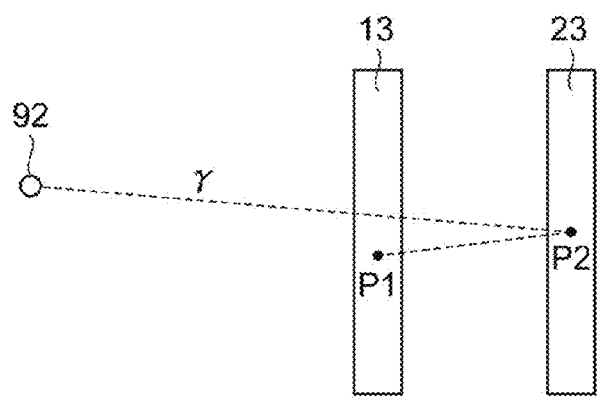
(c)
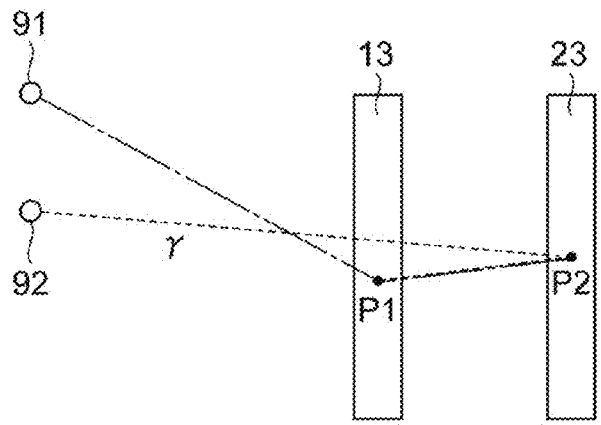

Fig.8
(a)
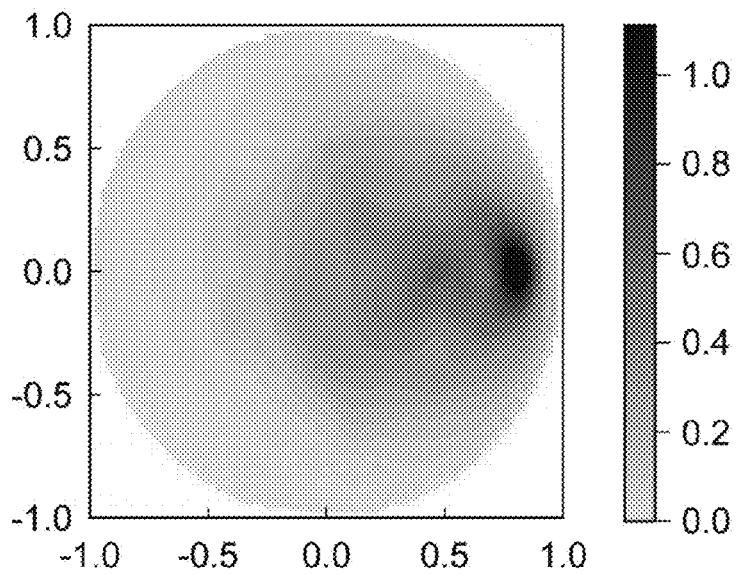
(b)
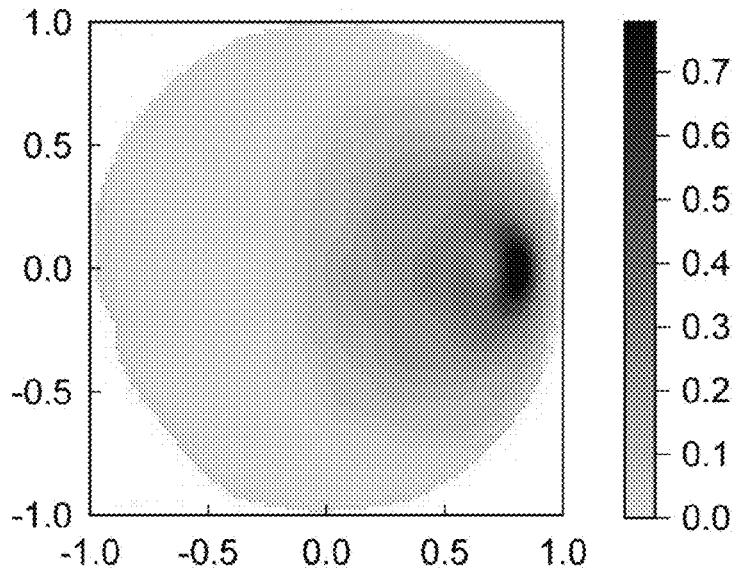

COMPTON CAMERA

TECHNICAL FIELD

The present invention relates to a Compton camera.

BACKGROUND ART

A Compton camera includes a scattering detection unit for detecting Compton scattering of incident radiation (primarily gamma-rays) and an absorption detection unit for detecting absorption of radiation incident by Compton scattering at the scattering detection unit, and coincidentally detects Compton scattering and absorption of the radiation. For a plurality of coincident detection events, the Compton camera obtains a position where radiation has undergone Compton scattering at the scattering detection unit, energy lost from the radiation when the radiation has undergone Compton scattering at the scattering detection unit, a position where the radiation has been absorbed in the absorption detection unit, and energy lost from the radiation when the radiation has been absorbed in the absorption detection unit, and based on these results, the camera can acquire an image of a radiation source.

CITATION LIST

Patent Literature

Patent Literature 1: Japanese Patent Application Laid-Open Publication No. 2005-208057
Patent Literature 2: Japanese Patent Application Laid-Open Publication No. 2011-85418
Patent Literature 3: Japanese Patent Publication No. 4352122

SUMMARY OF INVENTION

Technical Problem

In some cases on an image of a radiation source obtained by a conventional Compton camera, an unclear image may be produced at a correct position, or a wrong radiation source position may be indicated, due to an influence of noise. In particular, when the energy of the radiation is great, the influence of noise becomes great.

The present invention has been made in order to solve the above problem, and an object thereof is to provide a Compton camera capable of reducing noise.

Solution to Problem

The Compton camera according to the present invention is provided with (1) a scattering detection unit including a scatterer to cause incident radiation to undergo Compton scattering and detecting Compton scattering of the radiation at the scatterer, (2) an absorption detection unit including an absorber to absorb radiation incident after undergoing Compton scattering at the scatterer and detecting absorption of the radiation at the absorber, (3) a signal processing unit obtaining an image of a radiation source based on coincident detection events of Compton scattering of radiation at the scattering detection unit and absorption of radiation at the absorption detection unit, and (4) a first shield unit provided between the scattering detection unit and the absorption detection unit and configured, among forward-scattered radiation being radiation that has undergone Compton scattering in a forward direction at the scatterer and back-scattered radiation being radiation that has passed through the scatterer without being scattered or absorbed and has thereafter undergone Compton scattering in a backward direction at the absorber, to selectively allow the forward-scattered radiation to pass and selectively block the back-scattered radiation.

Advantageous Effects of Invention

According to the present invention, it is possible to reduce noise in an image of a radiation source obtained by the Compton camera.

BRIEF DESCRIPTION OF DRAWINGS

FIG. 1 includes (a), (b), (c) diagrams illustrating a forward-scattering event and a back-scattering event.
FIG. 8 includes (a), (b) diagrams illustrating results of a first simulation.

DESCRIPTION OF EMBODIMENTS

Figure 2:
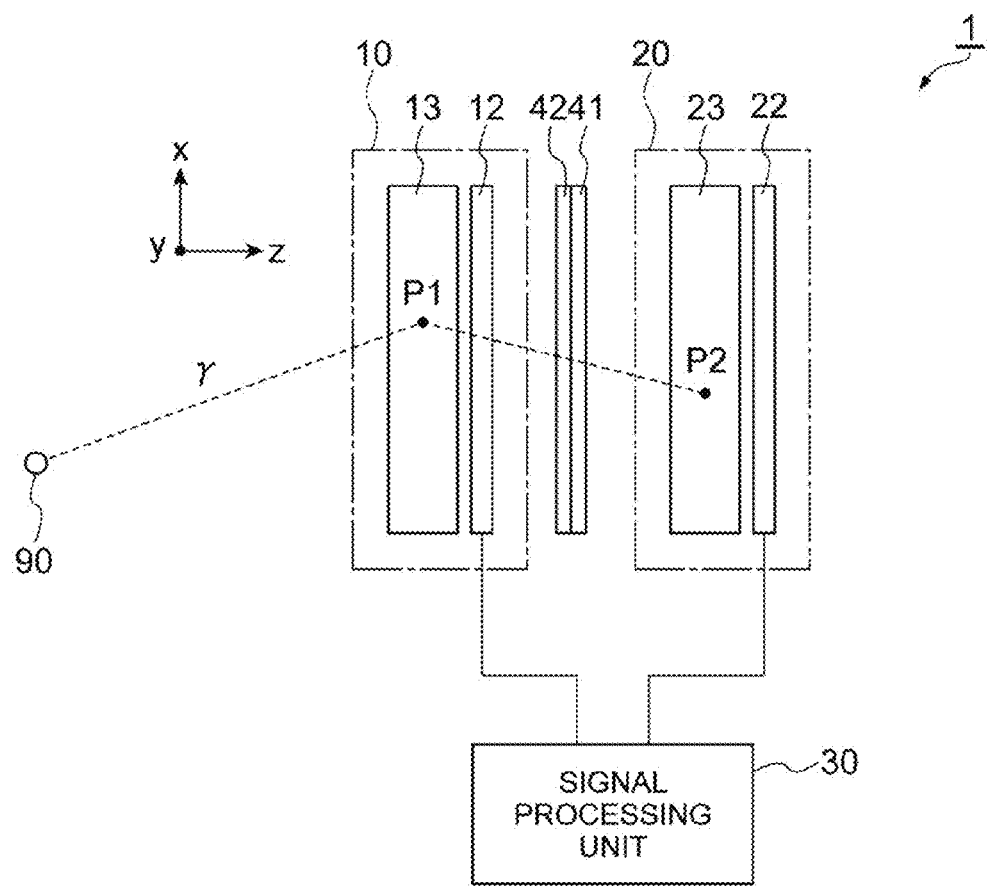
FIG. 2 is a diagram illustrating a configuration of a Compton camera 1 according to a first embodiment.

Hereinafter, embodiments of the present invention will be described in detail with reference to the accompanying drawings. In the description of the drawings, the same or equivalent elements will be denoted by the same reference signs, without redundant description. For convenience of explanation, an xyz orthogonal coordinate system is indicated in the diagrams.

First, a factor of noise generated on an image of a radiation source obtained by a Compton camera will be described. When the radiation is incident into the Compton camera, there is a possibility that not only a forward-scattering event but also a back-scattering event occurs. FIG. 1 includes diagrams illustrating a forward-scattering event and a back-scattering event, As illustrated in (a) in FIG. 1, the forward-scattering event is an event that radiation generated in a certain radiation source 91 undergoes Compton scattering at a position P1 in a scatterer 13 of the scattering detection unit, and the radiation that has undergone Compton scattering is absorbed at a position P2 in an absorber 23 of an absorption detection unit. In contrast, as illustrated in (b) in FIG. 1, the back-scattering event is an event that radiation generated in a certain radiation source 92 passes through the scatterer 13 without being scattered or absorbed and thereafter undergoes Compton scattering at a position P2 in the absorber 23, and the radiation that has undergone Compton scattering is absorbed at a position P1 in the scatterer 13. The energies lost at the scatterer 13 and at the absorber 23 are equivalent in both cases, and the energy lost at the absorber 23 is greater. Therefore, it is difficult to distinguish two events from values of the energy losses alone.

For this reason, an ordinary Compton camera assumes that all of a plurality of collected coincident detection events are forward-scattering events, and based on this assumption, executes predetermined calculation processing to obtain an image of a radiation source. In a case where the plurality of collected coincident detection events includes back-scattering events, the Compton camera treats the back-scattering events as forward-scattering events, and then, performs a predetermined analysis so as to obtain an image of the radiation source. Specifically, the Compton camera, as illustrated in (c) in FIG. 1, treats a back-scattering event of the radiation generated actually at the radiation source 92 as a forward-scattering event of the radiation generated at the radiation source 91 different from the actual position, and performs a predetermined analysis to obtain an image of the radiation source. As a result, the obtained image of the radiation source may indicate a wrong radiation source position.

When the energy of radiation is small, the forward-scattering event is dominant in coincident detection events. However, when the energy of radiation is great, the back-scattering event occurs more frequently and causes contribution of the noise to increase relatively. For example, radiation with energy of 662 keV generated from 137Cs and radiation with energy of 605 keV or 796 keV generated from 134Cs tend to pass through the scatterer 13 without being scattered or absorbed, being likely to cause a back-scattering event.

In order to identify a coincident detection event as either a forward-scattering event or a back-scattering event and to reduce an influence of the back-scattering event, a possible solution would be detecting a chronological relationship between the times of reactions (scattering or absorption) respectively at the scatterer 13 and the absorber 23. However, in a case of a small Compton camera in which a distance between the scatterer 13 and the absorber 23 is several centimeters, a time difference, between the respective reactions at the scatterer 13 and the absorber 23, is around $1 \times 10^{-10}$ seconds. From this, detecting the chronological relationship between times of reactions at the scatterer 13 and the absorber 23 is extremely difficult and impractical.

A Compton camera according to the present embodiment to be described below is capable of selectively reducing the back-scattering events and obtaining a radiation source image with improved image quality, by using a simple configuration.

FIG. 2 is a diagram illustrating a configuration of a Compton camera 1 according to a first embodiment. The Compton camera 1 includes a scattering detection unit 10, an absorption detection unit 20, a signal processing unit 30, a first shield unit 41, and a second shield unit 42, and can obtain an image of a radiation source 90. When radiation (for example, a gamma-ray) is emitted from the radiation source 90 and incident, the scattering detection unit 10 detects Compton scattering of the incident radiation. When radiation that has undergone Compton scattering at the scattering detection unit 10 is incident, the absorption detection unit 20 detects absorption of the incident radiation. The signal processing unit 30 obtains an image of the radiation source 90 based on coincident detection events of the Compton scattering of radiation in the scattering detection unit 10 and the absorption of radiation in the absorption detection unit 20. The first shield unit 41 and the second shield unit 42 are provided between the scattering detection unit 10 and the absorption detection unit 20.

The scattering detection unit 10 includes a photodetection unit 12 and a scatterer 13. The scatterer 13 is formed of a cuboid-shaped scintillator, and each of sides being parallel to one of the x direction, y direction, and z direction. The scatterer 13 generates scintillation light in response to Compton scattering of radiation. The photodetection unit 12 has a photodetecting surface parallel to an xy plane and receives the scintillation light output from the scatterer 13. The photodetection unit 12 outputs an electrical signal indicating a photodetecting position on the photodetecting surface and a photodetecting intensity to the signal processing unit 30. The photodetecting position (a centroid position of photodetection) on the photodetecting surface of the photodetection unit 12 corresponds to the position P1 where radiation has undergone Compton scattering at the scatterer 13. The photodetecting intensity at the photodetection unit 12 corresponds to the energy E1 lost from the radiation when the radiation has undergone Compton scattering at the scatterer 13.

The absorption detection unit 20 includes a photodetection unit 22 and an absorber 23, The absorber 23 is formed of a cuboid-shaped scintillator, and each of sides being parallel to one of the x direction, y direction, and z direction. The absorber 23 generates scintillation light in response to absorption of radiation. The photodetection unit 22 has a photodetecting surface parallel to an xy plane and receives the scintillation light output from the absorber 23. The photodetection unit 22 outputs an electrical signal indicating a photodetecting position on the photodetecting surface and a photodetecting intensity to the signal processing unit 30. The photodetecting position (a centroid position of photodetection) on the photodetecting surface of the photodetection unit 22 corresponds to the position P2 where radiation has been absorbed at the absorber 23. The photodetecting intensity at the photodetection unit 22 corresponds to the energy E2 lost from the radiation when the radiation has been absorbed at the absorber 23.

Examples of materials to be used as a scintillator to form the scatterer 13 and the absorber 23 include $Bi_4Ge_3O_{12}$ (BGO), Ce-doped $Lu_2SiO_5$ (Ce: LSO), $Lu_{2(1-x)}Y_{2x}SiO_5$ (LYSO), $Gd_2SiO_5$ (GSO), Pr-doped $Lu_3Al_5O_{12}$ (Pr: LuAG), and Ce-doped $Gd_3Al_2Ga_3O_{12}$ (Ce: GAGG).

As each of the photodetection units 12 and 22, a high-sensitivity semiconductor photodetecting device can be suitably used, and specifically, an MPPC (registered trademark) or an MPPC array, both being products of Hamamatsu Photonics K.K., can be suitably used. The MPPC (Multi-Pixel Photon Counter) is configured to have a plurality of pixels being arranged two-dimensionally, and in this, one pixel is formed by connecting a quenching resistor to an avalanche photodiode operating in a Geiger mode. Application of a reverse voltage enables the avalanche photodiode to multiply a photocurrent and perform photodetection with high speed and high sensitivity. When the reverse voltage of the avalanche photodiode is set to a same level of or above a breakdown voltage, an internal electric field is greatly increased and causes a multiplication factor to grow remarkably. Operation of the avalanche photodiode in this state is referred to as the Geiger mode.

The MPPC has a photon-counting capability. The MPPC can output an electrical signal indicating the total sum of the photodetecting amount on a plurality of pixels arranged two-dimensionally. In a case where this type of MPPC is used in the photodetection unit, for example, a plurality of MPPCs may be arranged two-dimensionally, and four output terminals and output of each of the MPPCs are connected via resistors, causing the electrical signal from each of the MPPCs to be finally output from the output terminal. The ratio of the electrical signal values output from the four output terminals corresponds to the position of light incidence into the light incidence surface, and the sum of the electrical signal values output from the four output terminals corresponds to the light intensity.

As each of the photodetection units 12 and 22, a position-detection type photomultiplier tube can also be suitably used, and specifically, a multi-anode type photomultiplier tube can be suitably used. The multi-anode photomultiplier tube includes, for example, a plurality of anodes arranged two-dimensionally and anode terminals each corresponding to each of the anodes, each of the anode terminals and four output terminals are connected via resisters, and electrical signals from each of the anodes are finally output from the four output terminals. The ratio of the electrical signal values output from the four output terminals corresponds to the position of light incidence into the light incidence surface, and the sum of the electrical signal values output from the four output terminals corresponds to the light intensity.

In the present embodiment, the photodetection unit 12 is arranged in a narrow region between the scatterer 13 and the absorber 23, and accordingly, it is desirable to use a semiconductor photodetecting device, which is smaller than the photomultiplier tube.

The first shield unit 41 is a plate-shaped member provided between the scattering detection unit 10 and the absorption detection unit 20. Into the first shield unit 41, not only radiation that has undergone Compton scattering in a forward direction at the scatterer 13 (namely, forward-scattered radiation generated by forward-scattering) is incident, but also radiation that passes through the scatterer 13 without being scattered or absorbed and thereafter has undergone Compton scattering in a backward direction at the absorber 23 (namely, back-scattered radiation generated by back-scattering) is incident.

The scattering angle at the time of back-scattering is greater than the scattering angle at the time of forward-scattering, and thus, the energy of the back-scattered radiation is smaller than the energy of the forward-scattered radiation. Based on the above energy magnitude relationship between the forward-scattered radiation and the back-scattered radiation, the first shield unit 41 selectively allows high-energy forward-scattered radiation to pass through and selectively blocks low-energy back-scattered radiation. In this manner, by providing the first shield unit 41 for selectively blocking back-scattered radiation, it is possible to reduce noise in an image of a radiation source obtained by the Compton camera 1.

In some cases, the first shield unit 41, when selectively blocking back-scattered radiation, emits characteristic X-rays specific to the material. The second shield unit 42 is provided for preventing the X-ray from causing noise. The second shield unit 42 is a plate-shaped member provided between the scattering detection unit 10 and the first shield unit 41 and blocks the X-ray generated by incidence of back-scattered radiation toward the first shield unit 41.

There may be a case where the characteristic X-ray that corresponds to K shell energy (about 50 keV) is generated from each of the scatterer 13 and the absorber 23, which are formed of a scintillator, and this X-ray can be a factor of noise. By providing the first shield unit 41 and the second shield unit 42, it is possible to further eliminate the influence of this X-ray.

A material and a thickness of the first shield unit 41 are appropriately determined according to the magnitude of the energy of the radiation emitted from the radiation source 90. A material and a thickness of the second shield unit 42 are appropriately determined according to the magnitude of the energy of the X-ray generated at the first shield unit 41. Examples of materials that can be employed as the first shield unit 41 include tin (Sn), lead (Pb), and tungsten (W). As the material of the second shield unit 42, it is possible to employ copper (Cu), or the like. The thickness of each of the first shield unit 41 and the second shield unit 42 is in a range from 1 mm or below to about several millimeters.

For example, the following will be described assuming a case where the energy E of radiation emitted from the radiation source 90 is 662 keV, the energy E1 that the radiation loses when the radiation undergoes Compton scattering at the scatterer 13 is about 200 keV, and the energy E2 that the radiation loses when the radiation is absorbed at the absorber 23 is about 460 keV. In this case, it is possible to employ, as the first shield unit 41, a plate-shaped member having a thickness of 3 mm and formed of tin, and it is possible to employ, as the second shield unit 42, a plate-shaped member having a thickness of 1 mm and formed of copper.

The first shield unit 41 having a thickness of 3 mm and formed of tin is capable of allowing 80% or more of forward-scattered radiation with energy of about 460 keV to pass and capable of blocking 50% or more of back-scattered radiation with energy of about 200 keV. In this manner, the first shield unit 41 is capable of selectively allowing forward-scattered radiation to pass and capable of selectively blocking back-scattered radiation.

While blocking back-scattered radiation with energy of about 200 keV, the first shield unit 41 formed of tin emits characteristic X-ray with energy of about 30 keV, in some cases. The second shield unit 42 having a thickness of 1 mm and formed of copper is capable of blocking the X-ray with energy of about 30 keV.

The signal processing unit 30 inputs an electrical signal output from the photodetection unit 12 of the scattering detection unit 10 and at the same time inputs the electrical signal output from the photodetection unit 22 of the absorption detection unit 20, and based on these electrical signals, the signal processing unit obtains an image of the radiation source 90.

Figure 3:
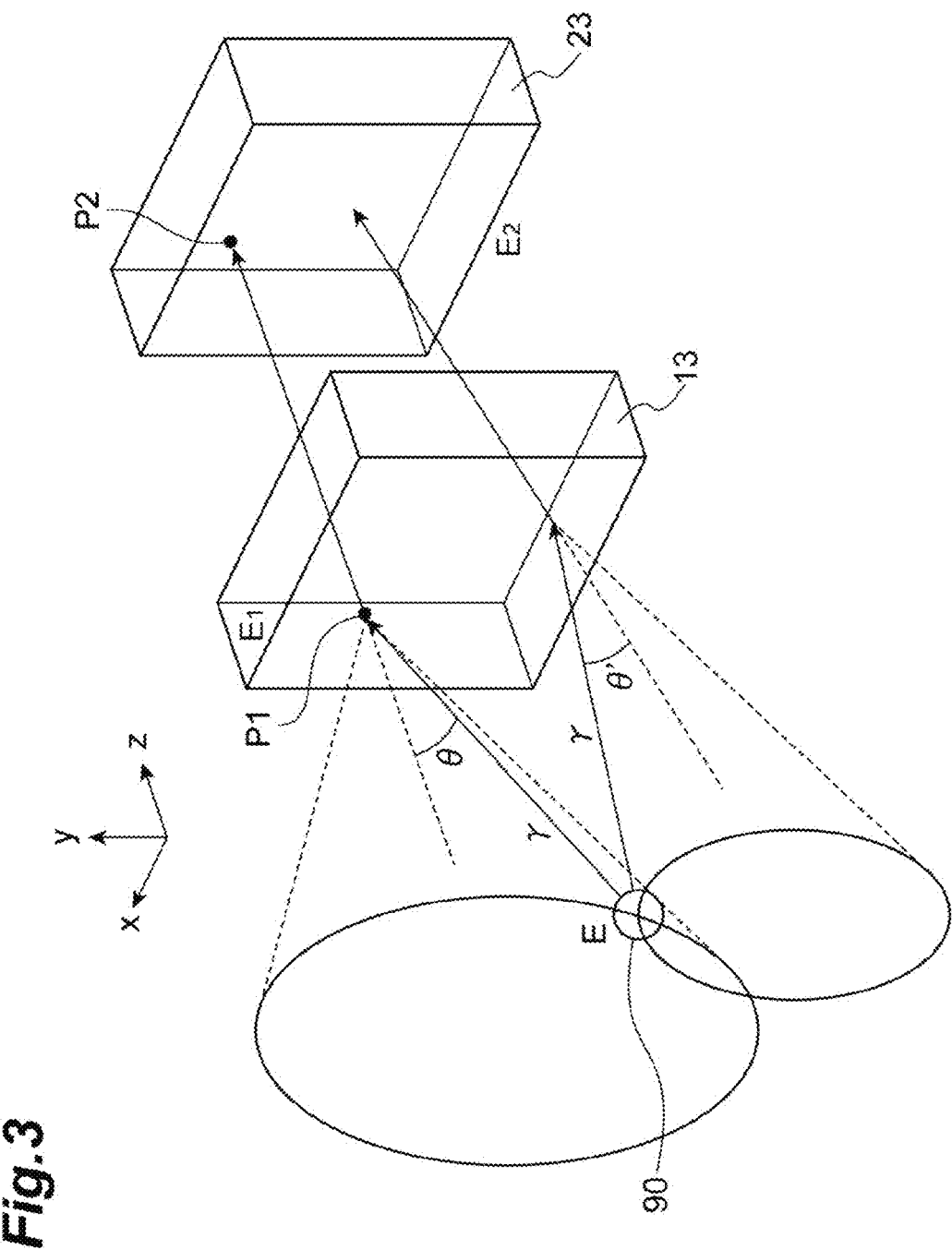
FIG. 3 is a perspective view illustrating processing, at a signal processing unit 30, of obtaining an image of a radiation source 90.

FIG. 3 is a perspective view illustrating processing, at a signal processing unit 30, of obtaining an image of the radiation source 90. Based on the electrical signals that have been output respectively from the photodetection units 12 and 22, the signal processing unit 30 can obtain the position P1 where radiation has undergone Compton scattering at the scatterer 13, the energy E1 lost from the radiation when the radiation has undergone Compton scattering at the scatterer 13, the position P2 where the radiation has been absorbed at the absorber 23, and the energy E2 lost from the radiation when the radiation has been absorbed at the absorber 23.

Herein, the energy of radiation emitted from the radiation source 90 is expressed as E. A scattering angle at the time of Compton scattering is expressed as θ. The rest mass of the electron is expressed as m, and the light speed in vacuum is expressed as c. These parameters have a relationship with each other as expressed with the formula below. Based on this relationship, it is possible to obtain a Compton scattering angle θ. Further, by assuming a circular cone with a line formed by connecting the scattering position P1 and the absorbing position P2 as a central axis, the scattering position P1 as a vertex, and an angle between the central axis and a generating line as θ, it is understandable that the radiation source 90 is present on a surface of the cone. The signal processing unit 30 obtains a conical surface as described above for each of a plurality of coincident detection events and based on these, obtains an image of the radiation source 90.

$$E = E1 + E2$$

$$\cos\theta = 1 + mc^2(1/E - 1/E2)$$

In the Compton camera 1 according to the present embodiment, the ratio of the back-scattering events included in the plurality of coincident detection events has been reduced by an action of the first shield unit 41, and accordingly, an image of the radiation source 90 obtained by the signal processing unit 30 is an image with a reduced level of noise.

Figure 4:
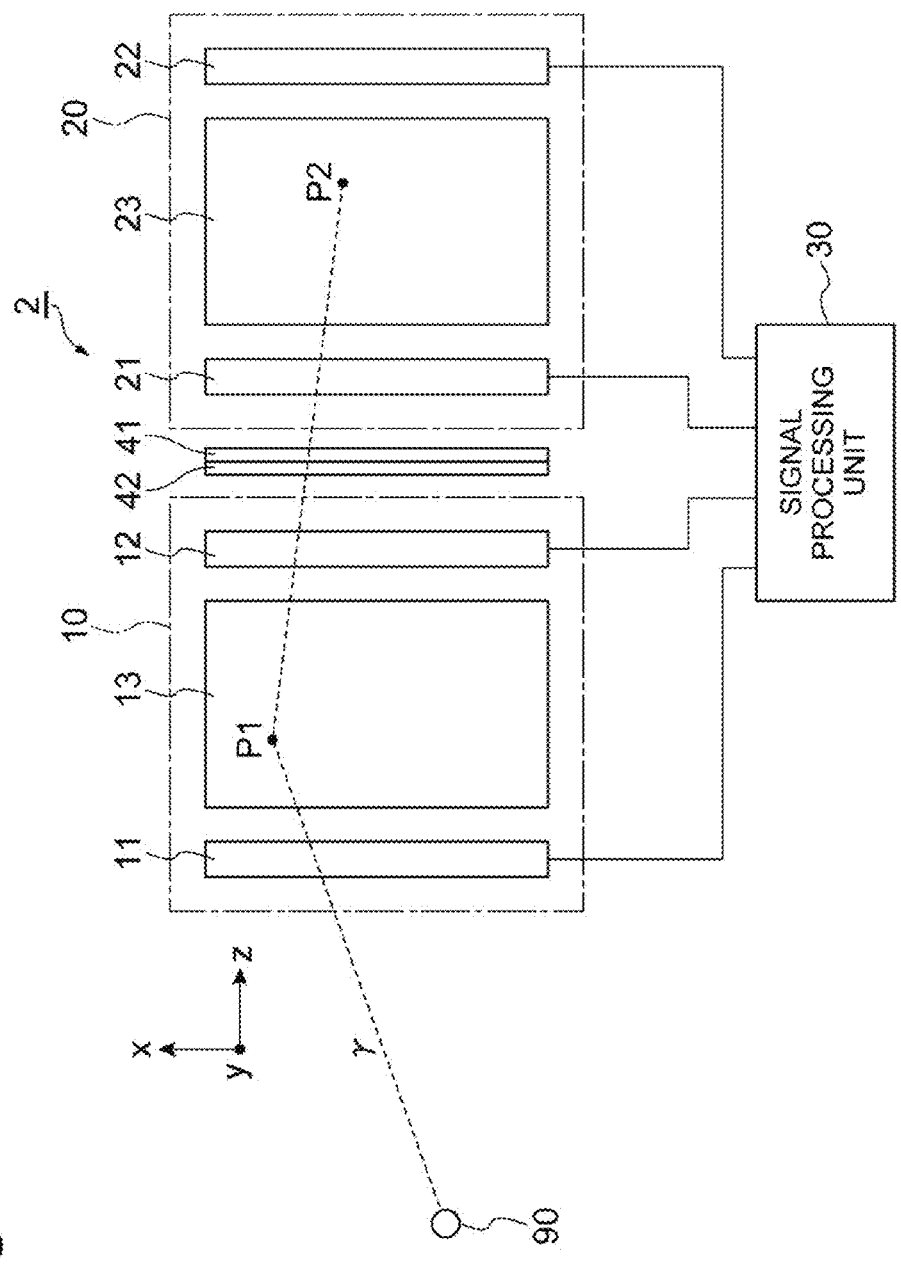
FIG. 4 is a diagram illustrating a configuration of a Compton camera 2 according to a second embodiment.

Next, a Compton camera 2 according to a second embodiment will be described. FIG. 4 is a diagram illustrating a configuration of the Compton camera 2 according to the second embodiment. The Compton camera 2 is provided with the scattering detection unit 10, the absorption detection unit 20, the signal processing unit 30, the first shield unit 41, and the second shield unit 42. Compared with the configuration of the Compton camera 1 according to the first embodiment as illustrated in FIG. 2, the Compton camera 2 according to the second embodiment as illustrated in FIG. 4 has the scattering detection unit 10 and the absorption detection unit 20 that are different from the first embodiment in configurations, and together with the difference, processing on the signal processing unit 30 also differs from the case of the first embodiment. Hereinafter, the present embodiment will be described mainly with reference to a difference from the first embodiment The scattering detection unit 10 includes a photodetection unit 11, the photodetection unit 12, and the scatterer 13. The scatterer 13 is a scintillator block and generates scintillation light in response to the Compton scattering of the radiation, and selectively allows the scintillation light to propagate in the −z direction and the +z direction so as to be output to the outside. The scatterer 13 is configured such that the ratio of respective scintillation light external output intensities in the −z direction and the +z direction differs depending on a scintillation light generation position. The scatterer 13 is cuboid-shaped, and each of sides being parallel to one of the x direction, y direction, and z direction. The scintillation light generation position in the scatterer 13 corresponds to the position P1 in which radiation has undergone Compton scattering. The scintillation light generation intensity in the scatterer 13 corresponds to the energy E1 lost from the radiation when the radiation has undergone Compton scattering.

Each of the photodetection units 11 and 12 has a photodetecting surface parallel to the xy plane. The photodetection unit 11 is provided on a side in the −z direction of the scatterer 13 and receives, on the photodetecting surface, scintillation light that has been output to the outside of the scatterer 13 in the −z direction, and outputs an electrical signal indicating the photodetecting position on the photodetecting surface and the photodetecting intensity to the signal processing unit 30. The photodetection unit 12 is provided on a side in the +z direction of the scatterer 13 and receives, on the photodetecting surface, scintillation light that has been output to the outside of the scatterer 13 in the +z direction, and outputs an electrical signal indicating the photodetecting position on the photodetecting surface and the photodetecting intensity to the signal processing unit 30.

The absorption detection unit 20 includes a photodetection unit 21, the photodetection unit 22, and the absorber 23. The absorber 23 is a scintillator block and generates scintillation light in response to absorption of the radiation, and selectively allows the scintillation light to propagate in the −z direction and the +z direction so as to be output to the outside. The absorber 23 is configured such that the ratio of respective scintillation light external output intensities in the −z direction and the +z direction differs depending on a scintillation light generation position. The absorber 23 is cuboid-shaped, and each of sides being parallel to one of the x, y, and z directions. The scintillation light generation position in the absorber 23 corresponds to the position P2 where radiation has been absorbed. The scintillation light generation intensity in the absorber 23 corresponds to the energy E2 lost from the radiation when the radiation has been absorbed.

Each of the photodetection units 21 and 22 has a photodetecting surface parallel to the xy plane. The photodetection unit 21 is provided on a side in the −z direction of the absorber 23 and receives, on the photodetecting surface, scintillation light that has been output to the outside of the absorber 23 in the −z direction, and outputs an electrical signal indicating the photodetecting position on the photodetecting surface and the photodetecting intensity to the signal processing unit 30. The photodetection unit 22 is provided on a side in the +z direction of the absorber 23 and receives, on the photodetecting surface, scintillation light that has been output to the outside of the absorber 23 in the +z direction, and outputs an electrical signal indicating the photodetecting position on the photodetecting surface and the photodetecting intensity to the signal processing unit 30.

As each of the photodetection units 11, 12, 21, and 22, a high-sensitivity semiconductor photodetecting device can be suitably used, and specifically, an MPPC (registered trademark) or an MPPC array (Hamamatsu Photonics K.K.) can be suitably used. Further, as each of the photodetection units 11, 12, 21, and 22, a position-detection type photomultiplier tube can also be suitably used, and specifically, a multi-anode type photomultiplier tube can be suitably used.

In the present embodiment, the photodetection units 12 and 21 are arranged in a narrow region between the scatterer 13 and the absorber 23, and accordingly, it is desirable to use a semiconductor photodetecting device, which is smaller than the photomultiplier tube. It is desirable to use a same type of device for the photodetection unit 11 and the photodetection unit 12, and it is desirable to use a same type of device for the photodetection unit 21 and the photodetection unit 22.

The signal processing unit 30 used in the second embodiment is substantially similar to that used in the first embodiment. Note that, each of the scatterer 13 and the absorber 23 is configured such that the ratio of the scintillation light external output intensities respectively in the −z direction and the +z direction differs depending on a scintillation light generation position, and this configuration makes it possible for the signal processing unit 30 to obtain the positions P1 and P2 also in the z direction as well as in the x direction and the y direction.

Figure 5:
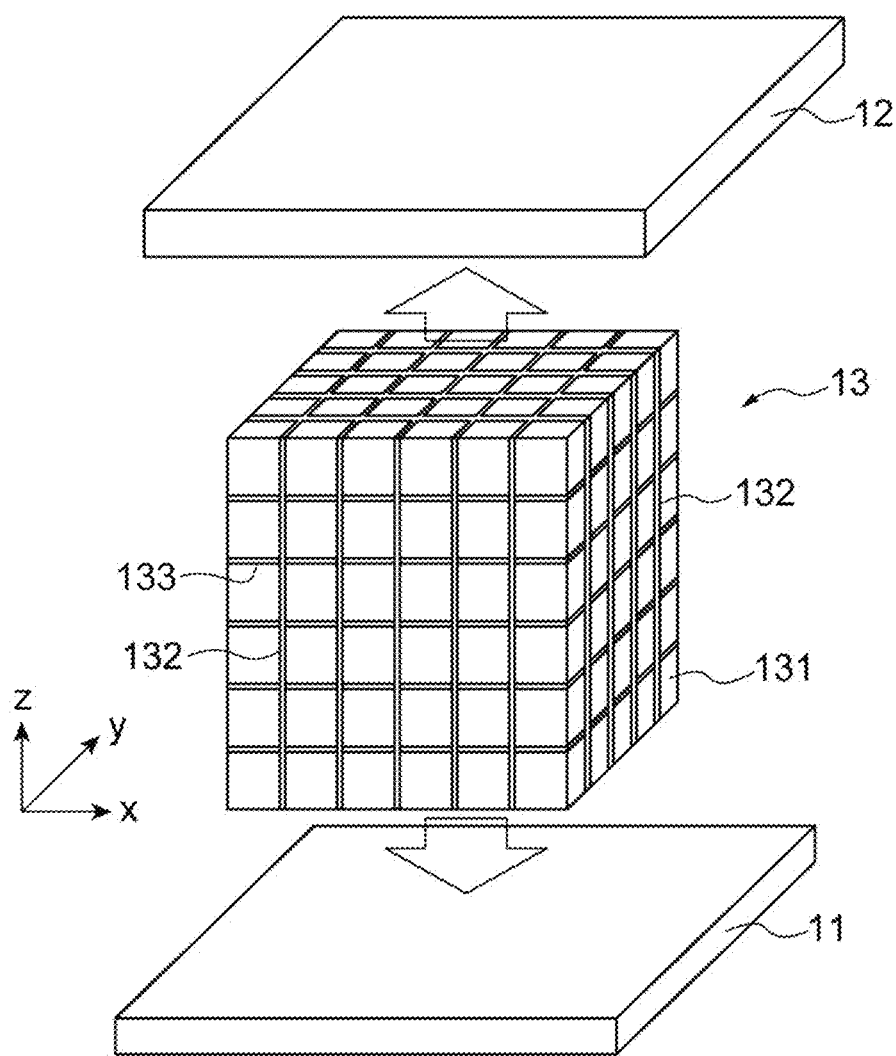
FIG. 5 is a perspective view illustrating a first configuration example of a scatterer 13 according to the second embodiment.

FIG. 5 is a perspective view illustrating a first configuration example of the scatterer 13 according to the second embodiment. Hereinafter, the scatterer 13 will be described, although the similar description can be applied to the absorber 23. The scatterer 13 is a scintillator block including a plurality of scintillator cells 131 arrayed three-dimensionally. In FIG. 5, a total of 180 scintillator cells 131 having a same shape are arrayed so as to include six rows in the x direction, five columns in the y direction, and six layers in the z-direction. The scatterer 13 is configured to be able to selectively allow the scintillation light to propagate in the −z direction and the +z direction according to an optical condition that has been set between two adjacent scintillator cells 131, and configured such that the ratio of the scintillation light external output intensities in the −z direction and the +z direction differs depending on a scintillation light generation position.

More specifically, for example, a reflective material 132 is inserted between two scintillator cells 131 adjacent to each other in the x direction, a reflective material 132 is also inserted between two scintillator cells 131 adjacent to each other in the y direction, and an air layer 133 is inserted between two scintillator cells 131 adjacent to each other in the z direction. Further, a reflective material is also provided onto four surfaces that do not face the photodetection units 11 and 12 among six surfaces of the scatterer 13. The reflective material 132 is formed, for example, of $BaSO_4$.

Provided that the reflective material 132 completely reflects scintillation light, the scintillation light generated in response to Compton scattering of radiation in a certain scintillator cell 131 does not propagate to another scintillator cell 131 that is adjacent in the ±x directions or the ±y directions, and instead, the scintillation light propagates exclusively to a scintillator cell 131 adjacent in the −z direction or the +z direction and is output to the outside in the −z direction or the +z direction. The scintillation light is partially reflected on the air layer 133 present on a way of propagation in the −z direction or the +z direction, and the remaining part is transmitted. Accordingly, the ratio of the scintillation light external output intensities in the −z direction and the ±z direction differs depending on the scintillation light generation position. With this configuration, it is possible to obtain sufficiently high positional resolution also in the z direction.

The reflective material 132 need not be a material that completely reflects the scintillation light, although it is desirable to use a material with high reflectance. In a case where the reflective material 132 partially transmits the scintillation light, the scintillation light that is output to the outside in the −z direction or the +z direction expands, and to cope with this, it is only required to obtain a centroid position of the photodetecting intensity distribution on the photodetecting surface of each of the photodetection units 11 and 12. It is also possible to insert a layer formed of another material instead of the air layer 133.

Figure 6:
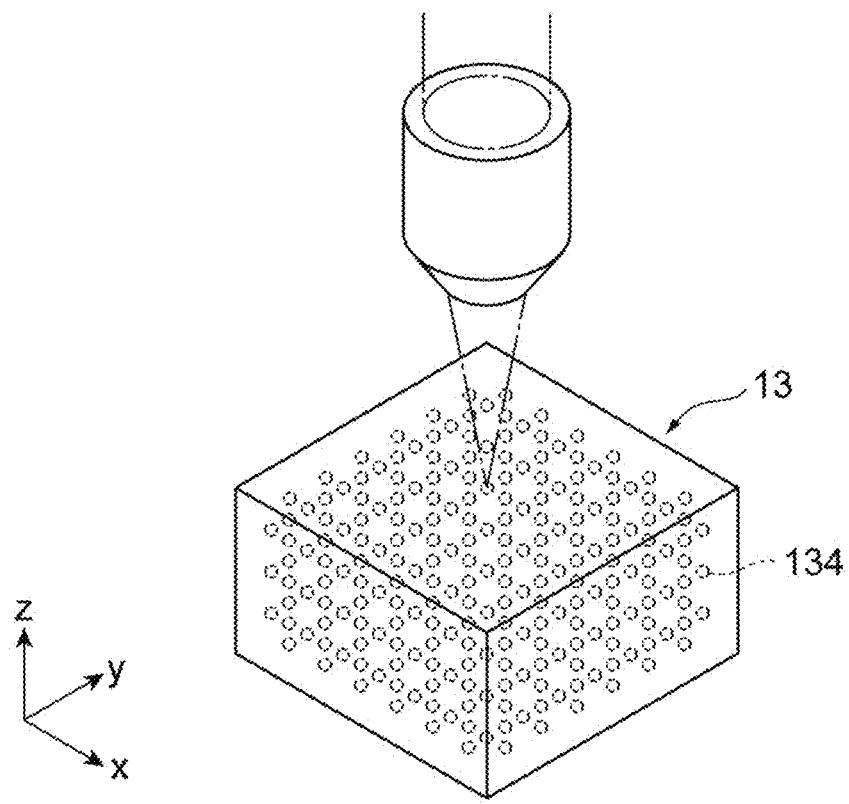
FIG. 6 is a perspective view illustrating a second configuration example of the scatterer 13 according to the second embodiment.

FIG. 6 is a perspective view illustrating a second configuration example of the scatterer 13 according to the second embodiment. Hereinafter, the scatterer 13 will be described, although the similar description can be applied to the absorber 23. The scatterer 13 is a scintillator block inside which numerous modified regions 134 are formed. The modified region 134 is formed by amorphization at a converging point of a laser beam and has a refractive index differing from a refractive index of surrounding portions.

The modified regions 134 may be formed discretely or continuously across a predetermined range. Examples of laser light sources used in forming the modified region 134 include light sources that emit short-pulse laser beams such as Nd: YAG laser, Yb: YAG laser, Nd: $YVO_4$ laser, Nd: YLF laser, Yb: KGW laser, and titanium sapphire laser.

It is also possible to form a breaking region with the modified region 134 as a starting point. It is possible to form the breaking region by applying stress, bending stress, shearing stress, and thermal stress. It is desirable to cover an external surface of the scatterer 13 with a sheet-shaped holding member prior to formation of the modified regions or the breaking regions, and with formation of this, it is possible to maintain integration of the scatterer 13 even after formation of the breaking regions. Further, a reflective material is provided onto four surfaces that do not face the photodetection units 11 and 12, among six surfaces of the scatterer 13.

The scatterer 13 formed as above is configured to be able to selectively allow the scintillation light to propagate in the −z direction and the +z direction by using the modified regions 134 or the breaking regions formed at appropriate positions, and configured such that the ratio of the scintillation light external output intensities in the −z direction and +z directions differs depending on the scintillation light generation position. In this configuration example, the scintillation light that is output to the outside in the −z direction or the +z direction expands, and to cope with this, by obtaining a centroid position of the photodetecting intensity distribution on the photodetecting surface of each of the photodetection units 11 and 12, it is possible to obtain high positional resolution in the x direction and the y direction.

The Compton camera 2 of the present embodiment detects Compton scattering or absorption of radiation using the scatterer 13 and the absorber 23 and thus can determine an incident position of the incident radiation (for example, a gamma-ray) three-dimensionally, and accordingly, it is possible to produce a Compton camera inexpensively while achieving high-resolution and miniaturization. The Compton camera 2 can also be suitably utilized in fields.

Figure 7:
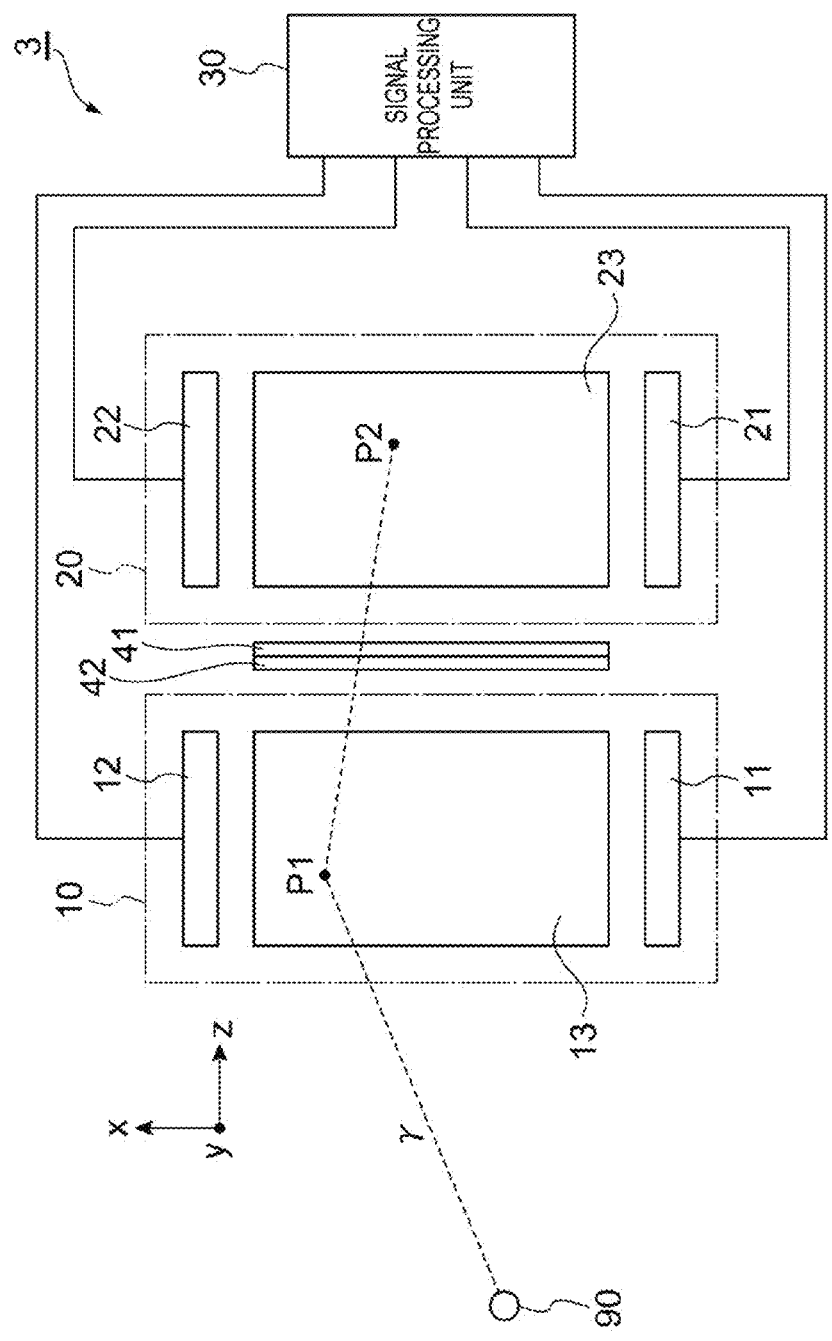
FIG. 7 is a diagram illustrating a configuration of a Compton camera 3 according to a third embodiment.

Next, a Compton camera 3 according to a third embodiment will be described. FIG. 7 is a diagram illustrating a configuration of the Compton camera 3 according to the third embodiment. The Compton camera 3 is provided with the scattering detection unit 10, the absorption detection unit 20, the signal processing unit 30, the first shield unit 41, and the second shield unit 42. Compared with the configuration of the Compton camera 2 according to the second embodiment as illustrated in FIG. 4, the Compton camera 3 according to the third embodiment as illustrated in FIG. 7 has the scattering detection unit 10 and the absorption detection unit 20 in different orientations from the case of the second embodiment. Hereinafter, the present embodiment will be described mainly with reference to a difference from the second embodiment.

The scatterer 13 of the scattering detection unit 10 generates scintillation light in response to the Compton scattering of radiation and selectively allows the scintillation light to propagate in the −x direction and the +x direction so as to be output to the outside. The scatterer 13 is configured such that the ratio of the scintillation light external output intensities in the −x direction and the +x direction differs depending on the scintillation light generation position. With this configuration, it is possible to obtain sufficiently high positional resolution in the x direction.

Each of the photodetection units 11 and 12 has a photodetecting surface parallel to the yz plane. The photodetection unit 11 is provided on a side in the −x direction of the scatterer 13 and receives, on the photodetecting surface, scintillation light that has been output to the outside of the scatterer 13 in the −x direction, and outputs an electrical signal indicating the photodetecting position on the photodetecting surface and the photodetecting intensity to the signal processing unit 30. The photodetection unit 12 is provided on a side in the +x direction of the scatterer 13 and receives, on the photodetecting surface, scintillation light that has been output to the outside of the scatterer 13 in the +x direction, and outputs an electrical signal indicating the photodetecting position on the photodetecting surface and the photodetecting intensity to the signal processing unit 30.

The absorber 23 of the absorption detection unit 20 generates scintillation light in response to absorption of the radiation and selectively allows the scintillation light to propagate in the −x direction and the +x direction so as to be output to the outside. The absorber 23 is configured such that the ratio of the scintillation light external output intensities in the −x direction and the +x direction differs depending on the scintillation light generation position. With this configuration, it is possible to obtain sufficiently high positional resolution in the x direction.

Each of the photodetection units 21 and 22 has a photodetecting surface parallel to the yz plane. The photodetection unit 21 is provided on a side in the −x direction of the absorber 23 and receives, on the photodetecting surface, scintillation light that has been output to the outside of the absorber 23 in the −x direction, and outputs an electrical signal indicating the photodetecting position on the photodetecting surface and the photodetecting intensity to the signal processing unit 30. The photodetection unit 22 is provided on a side in the +x direction of the absorber 23 and receives, on the photodetecting surface, scintillation light that has been output to the outside of the absorber 23 in the +x direction, and outputs an electrical signal indicating the photodetecting position on the photodetecting surface and the photodetecting intensity to the signal processing unit 30.

In the present embodiment, each of the photodetection units 11, 12, 21 and 22 is arranged in a large region, different from the narrow region between the scatterer 13 and the absorber 23, and accordingly, it is possible to suitably use a high-sensitivity photomultiplier tube. In a case where the scatterer 13 and the absorber 23 are greater in size in the x direction than in the z direction, intensity of scintillation light that is output in the ±x direction to the outside of the scatterer 13 and the absorber 23 may be smaller in the present embodiment compared to the case of the second embodiment, and to cope with this, it is possible to use a high-sensitivity photomultiplier tube as the photodetection units 11, 12, 21, and 22, and accordingly, it is possible to measure with high sensitivity the scattering position P1, the absorbing position P2, and the radiation lost energies E1 and E2. The Compton camera 3 according to the present embodiment can achieve a same effect as the case of the second embodiment.

Next, using FIG. 8 to FIG. 12, results of simulations performed to ensure effects of image quality improvement achieved by each of the first shield unit 41 and the second shield unit 42 will be described. Each of the simulations has employed the configuration, as illustrated in FIG. 2, of the Compton camera 1 according to the first embodiment, and has assumed a radiation source that emits energy of 662 keV.

FIG. 8 includes diagrams illustrating results of a first simulation. In the first simulation, it is assumed that the radiation source exists in a direction where the angle φ formed with an optical axis (z-axis) of the Compton camera 1 is 70° (end portion of view field), at a position in a distance of 50 cm from the Compton camera 1. As the first shield unit 41, a plate-shaped member having a thickness of 3 mm and formed of tin has been employed, and as the second shield unit 42, a plate-shaped member having a thickness of 1 mm and formed of copper has been employed. In the images in FIG. 8, each of the ranges of the horizontal axis and the vertical axis is set as −1 to +1, with the relationship between a distance r from a center position (0, 0) of the image and the above-described angle φ being r=√2sin (φ/2).

(a) in FIG. 8 is an image indicating a case where neither of the first shield unit 41 nor the second shield unit 42 has been provided. In this image, a ghost appears at a portion on a center side of a correct position of the radiation source 90, which is caused by a procedure in which a back-scattering event has been processed as a forward-scattering event (incorrect recognition of order). In contrast, (b) in FIG. 8 is an image indicating a case where both the first shield unit 41 and the second shield unit 42 have been provided. The influence of the back-scattering event has been reduced in this image and the image quality has been improved with substantially no occurrence of ghost.

Each of images (FIG. 9 to FIG. 12) of results of second to fifth simulations illustrated below indicates intensity distribution on a straight line passing through the center position (0, 0) and a radiation source existence position on an image as illustrated as FIG. 8, the intensity distribution being normalized with a peak value being set as 1.

Figure 9:
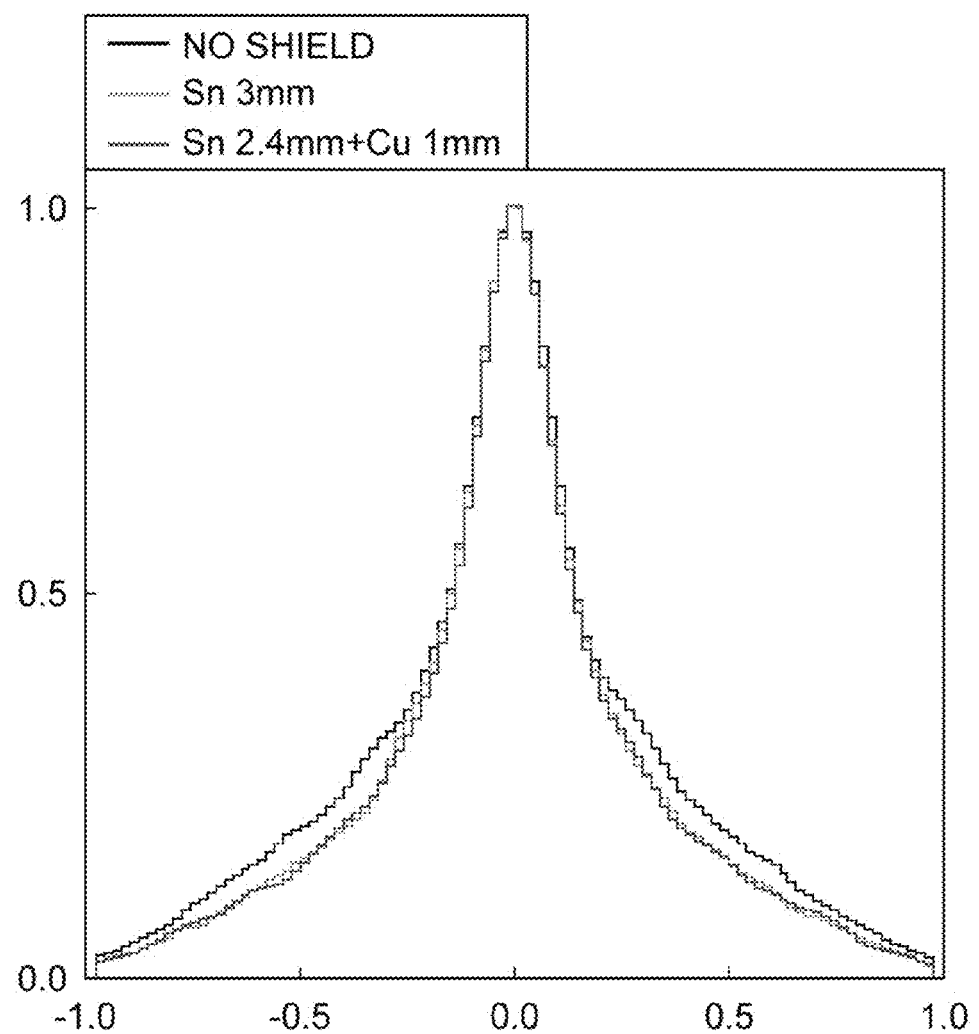
FIG. 9 is a diagram illustrating a result of a second simulation.
Figure 10:
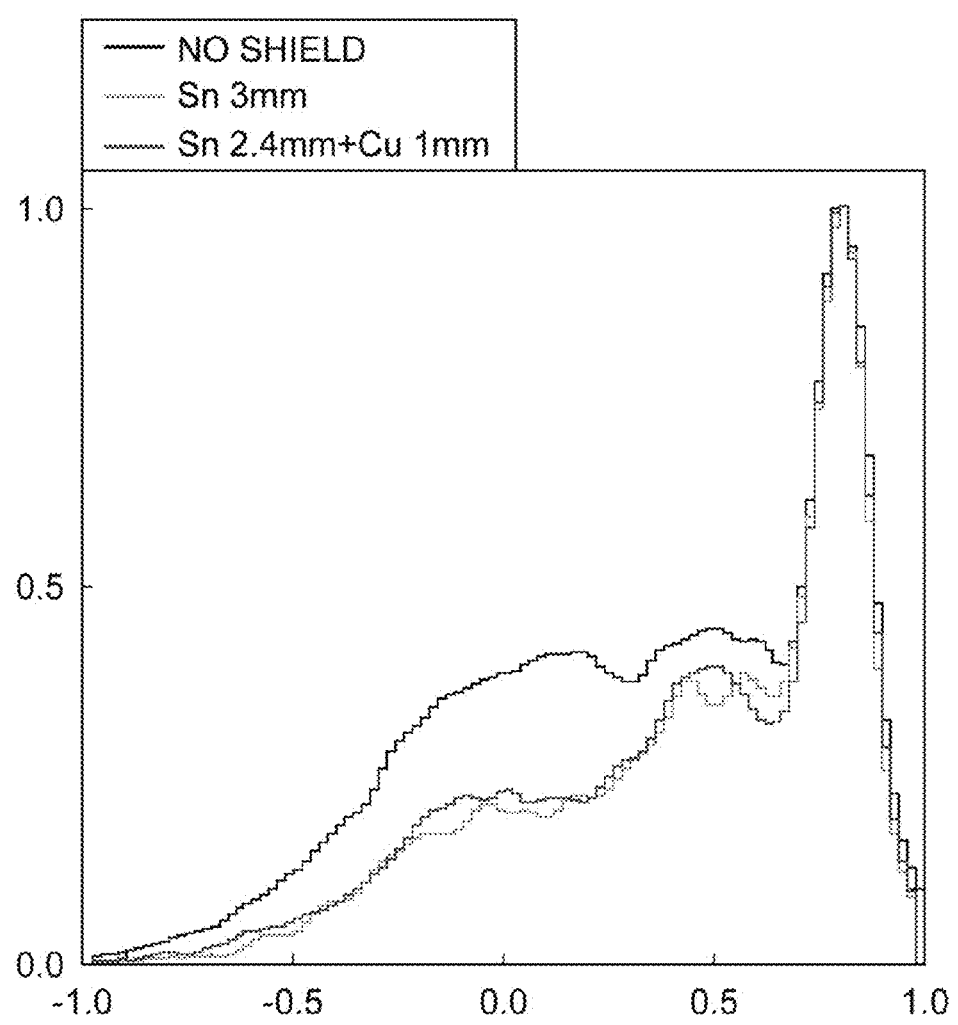
FIG. 10 is a diagram illustrating a result of a third simulation.

The second and third simulations have been performed to examine how the X-ray generated in the first shield unit 41 (tin) influences the image. FIG. 9 is a diagram illustrating a result of the second simulation. In the second simulation, it is assumed that the radiation source exists on the optical axis (center of view field) of the Compton camera 1, at a position where a distance from the Compton camera 1 is 50 cm. FIG. 10 is a diagram illustrating a result of the third simulation. In the third simulation, it is assumed that the radiation source exists in a direction where the angle φ formed with the optical axis (z-axis) of the Compton camera 1 is 70° (end portion of view field), at a position where a distance from the Compton camera 1 is 50 cm.

Each of the second and third simulations has been performed for first to third cases as below. In the first case, neither the first shield unit 41 nor the second shield unit 42 has been provided. In the second case, only the first shield unit 41 (tin, thickness of 3 mm) has been provided. In this second case, about 52% of the back-scattered radiation with 200 keV can be blocked, and the X-rays of 50 keV generated in the scintillator can be blocked substantially completely.

In the third case, the first shield unit 41 (tin, thickness of 2.4 mm) and the second shield unit 42 (copper, thickness of 1 mm) have been provided. In this third case, about 52% of the back-scattered radiation with 200 keV can be blocked, and the X-rays of 30 keV generated in the first shield unit 41 (tin) can be blocked substantially completely by the second shield unit 42 alone.

According to results of the second and third simulations, an image quality improvement effect is observed in the second and third cases in which the first shield unit 41 has been provided, compared with the first case in which the first shield unit 41 is not provided. Moreover, compared with a case where the radiation source exists in the center of the view field, the image quality improvement effect is greater in a case where the radiation source exists in an end portion of the view field.

Figure 11:
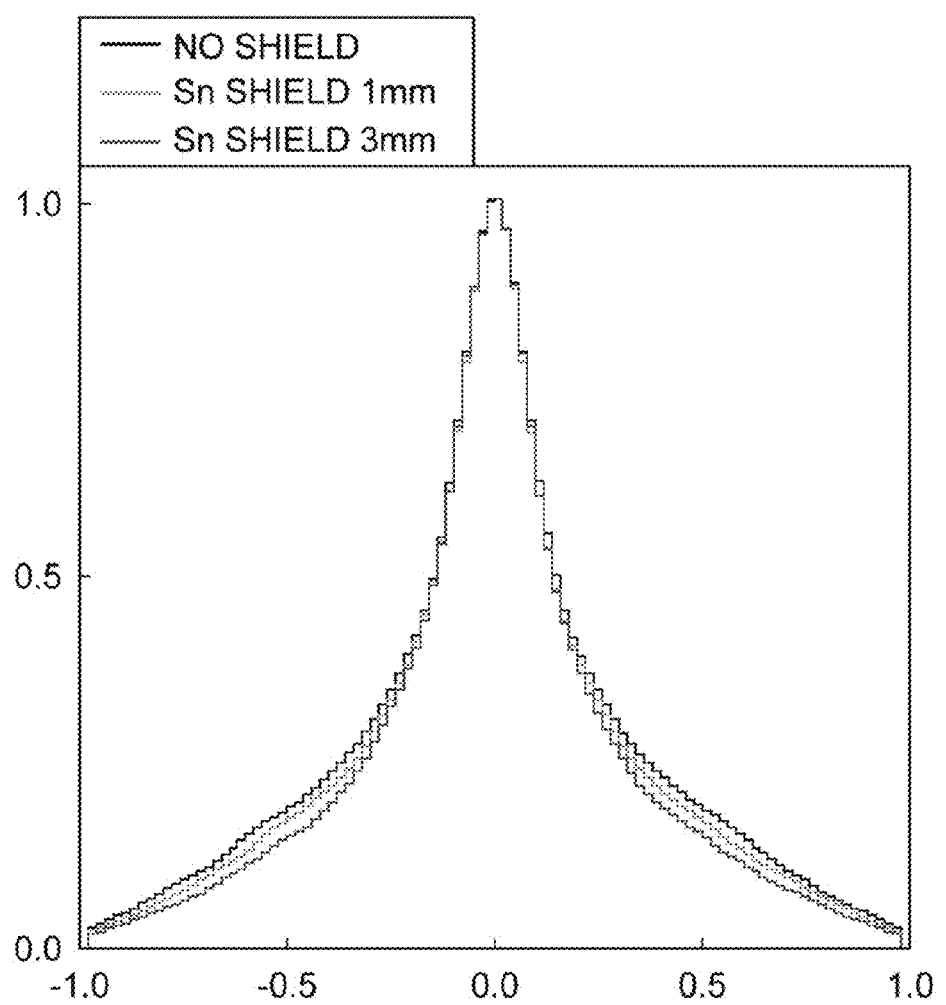
FIG. 11 is a diagram illustrating a result of a fourth simulation.
Figure 12:
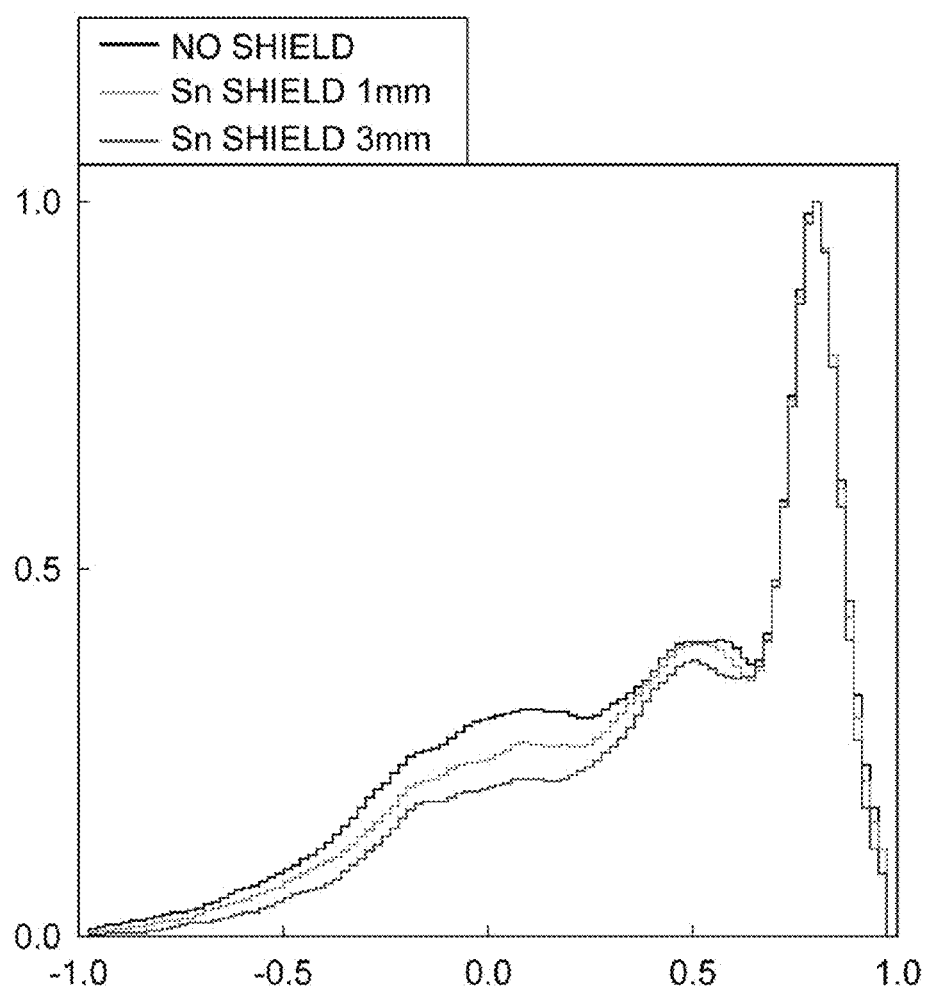
FIG. 12 is a diagram illustrating a result of a fifth simulation.

The fourth and fifth simulations have been performed to examine how the back-scattered radiation influences the image on an assumption that no characteristic X-ray is generated. FIG. 11 is a diagram illustrating a result of the fourth simulation. In the fourth simulation, it is assumed that the radiation source exists on the optical axis (center of view field) of the Compton camera 1, at a position where a distance from the Compton camera 1 is 50 cm. FIG. 12 is a diagram illustrating a result of the fifth simulation. In the fifth simulation, it is assumed that the radiation source exists in a direction where the angle φ formed with the optical axis (z-axis) of the Compton camera 1 is 70° (end portion of view field), at a position where a distance from the Compton camera 1 is 50 cm.

Each of the fourth and fifth simulations has been performed for first to third cases as below. In the first to third cases, the second shield unit 42 has not been provided. In the first case, the first shield unit 41 has also not been provided. In this first case, the back-scattered radiation cannot be blocked at all. In the second case, the first shield unit 41 (tin, thickness of 1 mm) has been provided. In this second case, about 21% of the back-scattered radiation with 200 keV can be blocked. In the third case, the first shield unit 41 (tin, thickness of 3 mm) has been provided. In this third case, about 52% of the back-scattered radiation with 200 keV can be blocked.

According to the results of the fourth and fifth simulations, the thicker the first shield unit 41 becomes, the greater the effect of image quality improvement. Moreover, compared with a case where the radiation source exists in the center of the view field, the image quality improvement effect is greater in a case where the radiation source exists in an end portion of the view field.

The present invention is not limited to the above-described embodiment but allows various modifications to be implemented. For example, various materials can be employed as a material of each of the first shield unit 41 and the second shield unit 42. As each of the scattering detection unit 10 and the absorption detection unit 20, it is possible to use components with any of configurations such as described in Patent Literatures 1 to 3. The orientation of each of the scattering detection unit 10 and the absorption detection unit 20 may differ from the case of the above-described embodiments.

The Compton camera according to the above-described embodiments includes (1) a scattering detection unit including a scatterer to cause incident radiation to undergo Compton scattering and detecting Compton scattering of the radiation at the scatterer, (2) an absorption detection unit including an absorber to absorb radiation incident after undergoing Compton scattering at the scatterer and detecting absorption of the radiation at the absorber, (3) a signal processing unit obtaining an image of a radiation source based on coincident detection events of Compton scattering of radiation in the scattering detection unit and absorption of radiation in the absorption detection unit, and (4) a first shield unit provided between the scattering detection unit and the absorption detection unit and configured, among radiation that has undergone Compton scattering at the scatterer (referred to as forward-scattered radiation) and radiation that has passed through the scatterer without being scattered or absorbed and has thereafter undergone Compton scattering at the absorber (referred to as back-scattered radiation), to selectively allow the forward-scattered radiation to pass and selectively block the back-scattered radiation.

Furthermore, it is preferable to configure such that the Compton camera with the above-described configuration further includes a second shield unit provided between the scattering detection unit and the first shield unit and configured to block X-ray generated by incidence of radiation into the first shield unit.

INDUSTRIAL APPLICABILITY

The present invention can be used as a Compton camera capable of reducing noise.

REFERENCE SIGNS LIST 1-3—Compton camera, 10—scattering detection unit, 11—photodetection unit, 12—photodetection unit, 13—scatterer, 20—absorption detection unit, 21—photodetection unit, 22—photodetection unit, 23—absorber, 30—signal processing unit, 41—first shield unit, 42—second shield unit, 90-92—radiation source.

The invention claimed is:
1. A Compton camera comprising:
a scattering detection unit including a scatterer to cause incident radiation to undergo Compton scattering and detecting Compton scattering of the radiation at the scatterer;
an absorption detection unit including an absorber to absorb radiation incident after undergoing Compton scattering at the scatterer and detecting absorption of the radiation at the absorber;
a signal processing unit obtaining an image of a radiation source based on coincident detection events of Compton scattering of radiation at the scattering detection unit and absorption of radiation at the absorption detection unit; and
a first shield unit being a plate-shaped member, provided between the scattering detection unit and the absorption detection unit and configured, among forward-scattered radiation being radiation that has undergone Compton scattering in a forward direction at the scatterer, and back-scattered radiation being radiation that has passed through the scatterer without being scattered or absorbed and has thereafter undergone Compton scattering in a backward direction at the absorber, to selectively allow the forward-scattered radiation to pass and to selectively block the back-scattered radiation.
2. The Compton camera according to claim 1, further comprising a second shield unit provided between the scattering detection unit and the first shield unit and configured to block X-ray generated by incidence of radiation into the first shield unit.

* * * * *